US012608956B2

(12) United States Patent
Ikeda et al.

(10) Patent No.: US 12,608,956 B2
(45) Date of Patent: Apr. 21, 2026

(54) TRAFFIC LIGHT RECOGNIZING APPARATUS

(71) Applicant: SUBARU CORPORATION, Tokyo (JP)

(72) Inventors: Reo Ikeda, Tokyo (JP); Takahiro Furuya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 247 days.

(21) Appl. No.: 18/666,538

(22) Filed: May 16, 2024

(65) Prior Publication Data

US 2024/0404300 A1 Dec. 5, 2024

(30) Foreign Application Priority Data

Jun. 2, 2023 (JP) ................................. 2023-091569

(51) Int. Cl.
| | |
|---|---|
| *G06V 20/58* | (2022.01) |
| *G06T 7/70* | (2017.01) |
| *G06V 10/22* | (2022.01) |
| *G06V 10/24* | (2022.01) |
| *G06V 10/56* | (2022.01) |

(52) U.S. Cl.
CPC .............. *G06V 20/584* (2022.01); *G06T 7/70* (2017.01); *G06V 10/23* (2022.01); *G06V 10/245* (2022.01); *G06V 10/56* (2022.01); *G06T 2207/30252* (2013.01)

(58) Field of Classification Search
CPC ...... G06V 20/58; G06V 20/584; G06V 10/22; G06V 10/23; G06V 10/245; G06V 10/56; G06T 7/70–77; G06T 7/90; G06T 2207/30252
See application file for complete search history.

(56) References Cited

U.S. PATENT DOCUMENTS

| | | | |
|---|---|---|---|
| 2019/0087961 A1* | 3/2019 | Tian ........................... | G06T 7/90 |
| 2022/0036732 A1* | 2/2022 | Chen ................... | G01C 21/3811 |
| 2023/0401875 A1* | 12/2023 | Chien .................... | G06V 10/56 |
| 2024/0312223 A1* | 9/2024 | Kakita ................... | G06V 10/56 |

FOREIGN PATENT DOCUMENTS

JP 2022-108518 A 7/2022

* cited by examiner

*Primary Examiner* — Geoffrey E Summers
(74) *Attorney, Agent, or Firm* — Rimon P.C.

(57) ABSTRACT

A traffic light recognizing apparatus includes: an imager configured to capture a color image of driving environment; a lighting region detector detecting a lighting region in a traffic light body on the image; a first lamp detector detecting a lamp in an ON state in the traffic light body based on the lighting region; a first search area setter setting search areas having the same dimensions as the lamp and horizontally and vertically aligned with the lamp on the image, in accordance with a lighting color of the lighting region; a second lamp detector evaluating luminances at an edge and in a center of each search area, and detecting lamps in an OFF state in the traffic light body; and an orientation determiner determining whether the traffic light body is horizontally or vertically disposed based on the arrangement of the lamps in the ON and OFF states.

4 Claims, 11 Drawing Sheets

FIG. 4

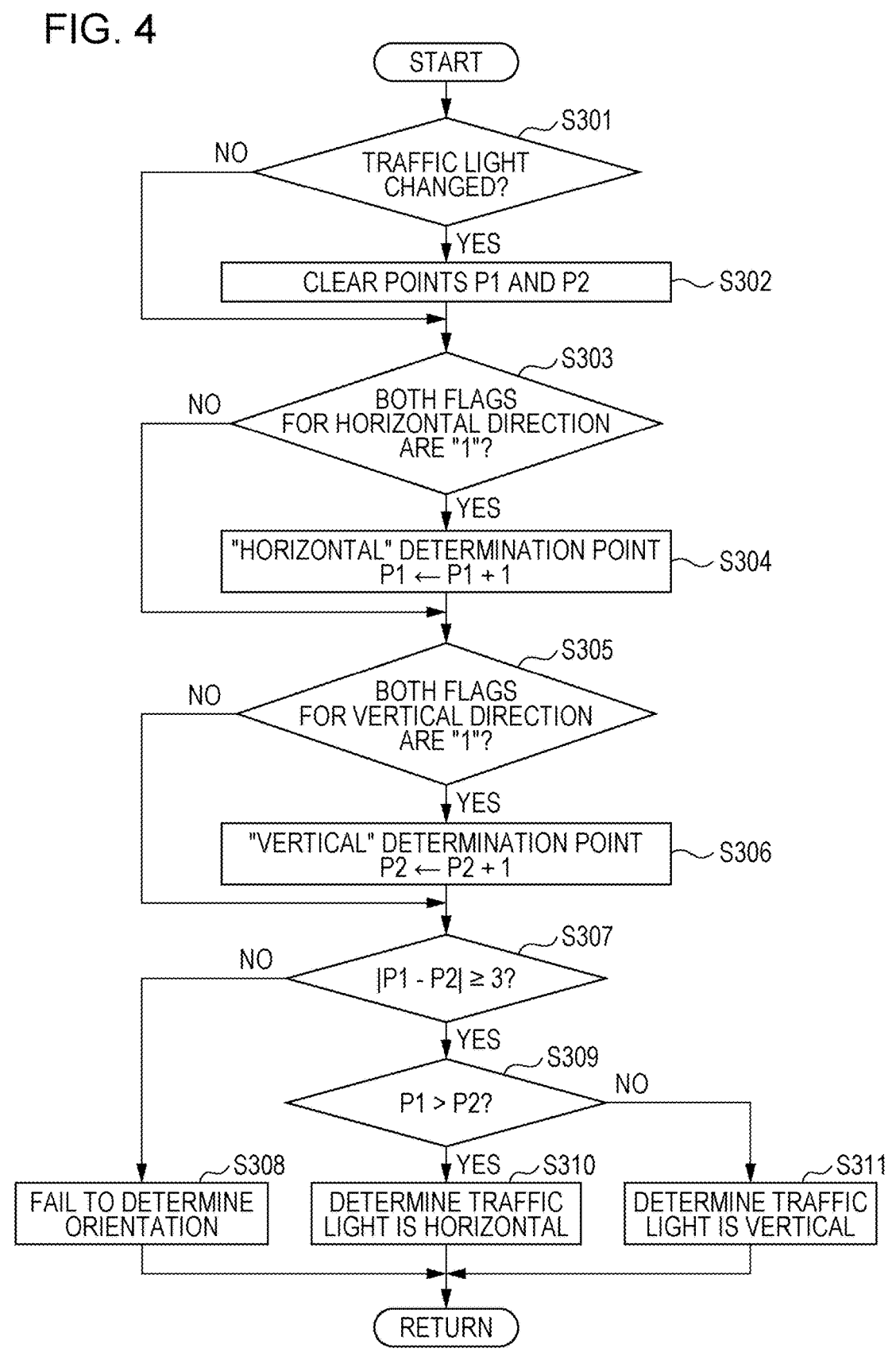

START

S301
TRAFFIC LIGHT CHANGED?

NO

YES

CLEAR POINTS P1 AND P2 ~ S302

S303
BOTH FLAGS FOR HORIZONTAL DIRECTION ARE "1"?

NO

YES

"HORIZONTAL" DETERMINATION POINT $P1 \leftarrow P1 + 1$ ~ S304

S305
BOTH FLAGS FOR VERTICAL DIRECTION ARE "1"?

NO

YES

"VERTICAL" DETERMINATION POINT $P2 \leftarrow P2 + 1$ ~ S306

S307
$|P1 - P2| \geq 3$?

NO

YES

S309
$P1 > P2$?

NO

YES ~ S310

~ S308
FAIL TO DETERMINE ORIENTATION

DETERMINE TRAFFIC LIGHT IS HORIZONTAL

~ S311
DETERMINE TRAFFIC LIGHT IS VERTICAL

RETURN

FIG. 6

FIG. 10
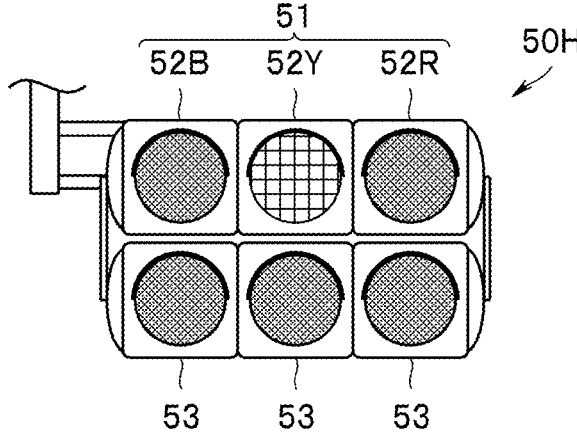
FIG. 11
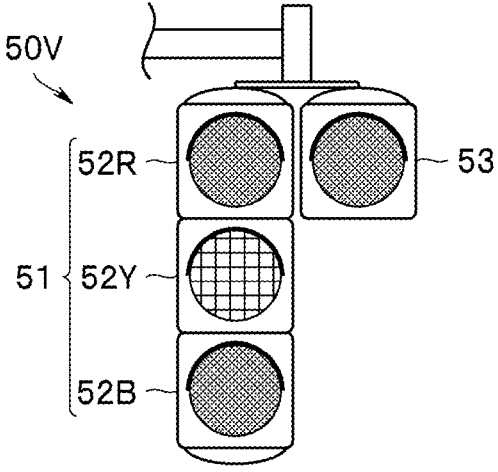
FIG. 12
VERTICAL [0]
HORIZONTAL [1]
HORIZONTAL [0]
VERTICAL [1]

TRAFFIC LIGHT RECOGNIZING APPARATUS

CROSS-REFERENCE TO RELATED APPLICATIONS

The present application claims priority from Japanese Patent Application No. 2023-091569 filed on Jun. 2, 2023, the entire contents of which are hereby incorporated by reference

BACKGROUND

The disclosure relates to a traffic light recognizing apparatus configured to recognize a traffic light on the basis of image information obtained by imaging a driving environment.

Many vehicles, such as automobiles, are equipped with a driving assistance apparatus these days. Basically, the driving assistance apparatus implements driving assistance control, for example, with the adaptive cruise control (ACC) function and the active lane keep centering (ALKC) control function. The driving assistance control enables the driving assistance apparatus to reduce the burden of driving operations on the driver who drives the vehicle and improve safety during driving.

For the driving assistance apparatuses, various techniques have been proposed to achieve more convenience. For example, a technique has been proposed which recognizes a traffic light on the basis of image data obtained by imaging the area in front of the vehicle, and automatically stops or starts the vehicle at an intersection or the like in accordance with the lighting state of the traffic light recognized.

For example, Japanese Unexamined Patent Application Publication (JP-A) No. 2022-108518 discloses a traffic light recognizing apparatus for recognizing a traffic light on the basis of image data. The traffic light recognizing apparatus performs template matching by using a template that represents a typical outline of a traffic light. The traffic light recognizing apparatus thus sets a traffic light region. The traffic light recognizing apparatus then extracts, as a lighting region, a region having a luminance value greater than or equal to a reference value in the traffic light region. When there are more than one lighting region, the traffic light recognizing apparatus determines, for each lighting region, the presence of a saturated area and the outer shape of the lighting region or the saturated area. The traffic light recognizing apparatus thus determines the lighting of a three-lamp traffic light body and an arrow lamp.

SUMMARY

An aspect of the disclosure provides a traffic light recognizing apparatus to be applied to a vehicle. The traffic light recognizing apparatus includes an imager, a lighting region detector, a first lamp detector, a first search area setter, a second lamp detector, and an orientation determiner. The imager is configured to perform a color imaging to capture an image of a driving environment in front of the vehicle. The lighting region detector is configured to detect a lighting region in a traffic light body of a traffic light on the image captured by the imager. The first lamp detector is configured to detect a lamp in an ON state among lamps arranged in the traffic light body based on the lighting region. The first search area setter is configured to set search areas having the same dimensions as the lamp in the ON state at specific positions on the image that are horizontally and vertically aligned with the lamp in the ON state and are according to a lighting color of the lighting region. The second lamp detector is configured to evaluate a luminance at an edge of each of the search areas and a luminance in a center of each of the search areas, and detect lamps in an OFF state among the lamps arranged in the traffic light body. The orientation determiner is configured to determine whether the traffic light body is disposed in a horizontal or vertical orientation based on an arrangement of the lamp in the ON state and the lamps in the OFF state.

An aspect of the disclosure provides a traffic light recognizing apparatus to be applied to a vehicle. The traffic light recognizing apparatus includes a camera and a processor. The camera is configured to perform a color imaging to capture a color image of a driving environment in front of the vehicle. The processor is configured to detect a lighting region in a traffic light body of a traffic light on the image captured by the camera. The processor is configured to detect a lamp in an ON state among lamps arranged in the traffic light body based on the lighting region. The processor is configured to set search areas having the same dimensions as the lamp in the ON state at specific positions on the image that are horizontally and vertically aligned with the lamp in the ON state and are according to a lighting color of the lighting region. The processor is configured to evaluate a luminance at an edge of each of the search areas and a luminance in a center of each of the search areas, and detect lamps in an OFF state among the lamps arranged in the traffic light body. The processor is configured to determine whether the traffic light body is disposed in a horizontal or vertical orientation based on an arrangement of the lamp in the ON state and the lamps in the OFF state.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 4 is a flowchart illustrating a first orientation determination subroutine;

FIG. 6 is a diagram schematically illustrating an image of driving environment in front of a vehicle;

FIG. 7 is a plan view illustrating a horizontal traffic light with a green lamp ON;

FIG. 8 is a plan view illustrating a vertical traffic light with a green lamp ON;

FIG. 9 is an explanatory diagram illustrating search areas for searching for yellow and red lamps when a green lamp is ON;

FIG. 10 is a plan view illustrating a horizontal traffic light with a yellow lamp ON;

FIG. 11 is a plan view illustrating a vertical traffic light with a yellow lamp ON;

FIG. 12 is an explanatory diagram illustrating search areas for searching for green and red lamps when a yellow lamp is ON;

FIG. 13 is a plan view illustrating a horizontal traffic light with a red lamp ON;

FIG. 14 is a plan view illustrating a vertical traffic light with a red lamp ON;

FIG. 15 is an explanatory diagram illustrating search areas for searching for green and yellow lamps when a red lamp is ON;

FIG. 20 is a plan view illustrating a horizontal traffic light with arrow lamps on; and FIG. 21 is a plan view illustrating a vertical traffic light with an arrow lamp ON.

DETAILED DESCRIPTION

To set a traffic light region by performing template matching as in the technique disclosed in JP-A No. 2022-108518, an edge that represents the outline of the traffic light is to appear on the image. In the technique disclosed in JP-A No. 2022-108518, it is difficult to set the traffic light region for a traffic light whose edge is unclear on the image, such as for a traffic light distant from the vehicle. With the technique disclosed in JP-A No. 2022-108518, therefore, it may be difficult to narrow down the search areas, for example, for arrow lamps even when lighting of the traffic light body is recognized.

It is desirable to provide a traffic light recognizing apparatus that can efficiently search for the lighting of arrow lamps.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
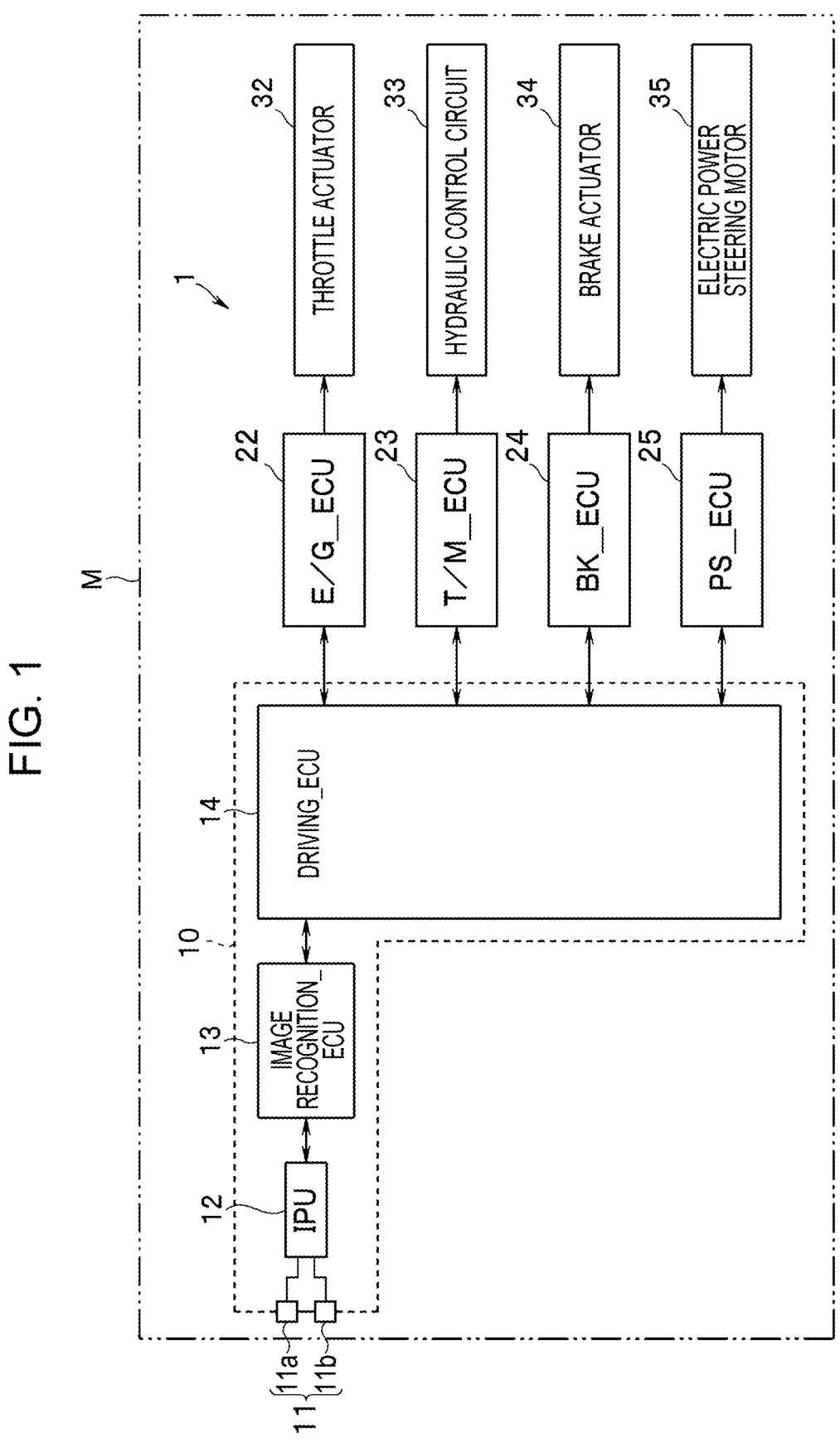
FIG. 1 is a schematic diagram illustrating a configuration of a driving assistance apparatus.

FIG. 1 is a diagram illustrating an overall configuration of a driving assistance apparatus according to the embodiment. As illustrated in FIG. 1, a driving assistance apparatus 1 includes a camera unit 10 secured to, for example, the front upper center of the interior of a vehicle M.

The camera unit 10 includes a stereo camera 11 serving as an imager, an image processing unit (IPU) 12, an image recognition unit (image recognition_ECU) 13, and a driving control unit (driving_ECU) 14.

The stereo camera 11 includes a main camera 11*a* and a sub-camera 11*b*. The main camera 11*a* and the sub-camera 11*b* are symmetrically arranged on both sides of the center of the vehicle M in the width direction. The main camera 11*a* and the sub-camera 11*b* each include, for example, an imaging element, such as a complementary metal oxide semiconductor (CMOS), and a color filter. The main camera 11*a* and the sub-camera 11*b* thus capture color images of the driving environment in front of the vehicle M from different viewpoints, in predetermined imaging cycles that are synchronized with each other.

The IPU 12 performs predetermined image processing on the images of the driving environment captured by the stereo camera 11 and detect edges of various objects, such as three-dimensional objects and traffic lines on the road surface, appearing on the images. Also, the IPU 12 determines range information from the amount of positional shift between corresponding edges on the right and left images. The IPU 12 generates image information including the range information (range image information).

The image recognition_ECU 13 determines information on the travel path (vehicle's travel path) along which the vehicle M travels, on the basis of, for example, the range image information received from the IPU 12. For example, the image recognition_ECU 13 determines the curvature (1/m) of right and left traffic lines defining the vehicle's travel path and the width (lane width) between the right and left traffic lines. Also, the image recognition_ECU 13 calculates the lane width from the difference between the curvatures of the right and left traffic lines.

The image recognition_ECU 13 performs, for example, predetermined pattern matching on the range image information to recognize three-dimensional objects, such as guardrails and curbs extending along the road and vehicles around the vehicle M. Recognizing three-dimensional objects in the image recognition_ECU 13 involves recognizing, for example, the type of the three-dimensional object, the distance to the three-dimensional object, the speed of the three-dimensional object, and the speed of the three-dimensional object relative to the vehicle M.

The image recognition_ECU 13 also performs traffic light recognition for a traffic light in front of the vehicle M. In this traffic light recognition, the image recognition_ECU 13 recognizes the lighting state of each of lamps (green, yellow, and red lamps) arranged in a traffic light body. When the traffic light body has an arrow lamp added thereto, the image recognition_ECU 13 also recognizes the lighting state of the arrow lamp.

In the present embodiment, the stereo camera 11, the IPU 12, and the image recognition_ECU 13 correspond to exemplary components of a traffic light recognizing apparatus.

Figure 7:
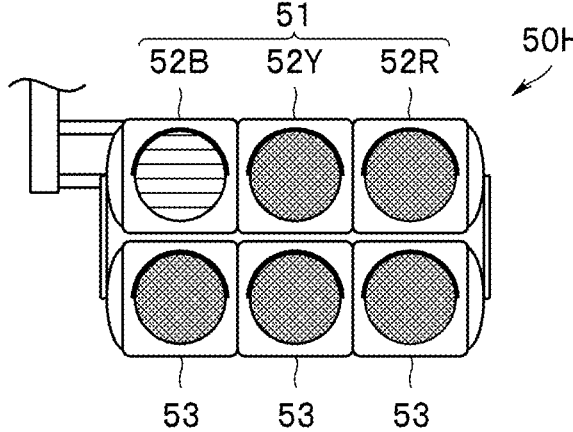
Figure 8:
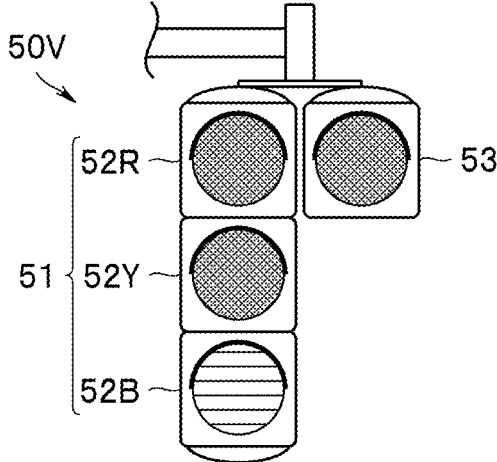

As illustrated in FIGS. 7 and 8, examples of traffic lights installed on the road include a traffic light 50H with a traffic light body 51 disposed in a horizontal orientation and a traffic light 50V with the traffic light body 51 disposed in a vertical orientation. The traffic light body 51 disposed in the horizontal orientation includes a green lamp 52B, a yellow lamp 52Y, and a red lamp 52R horizontally arranged. The traffic light body 51 disposed in the vertical orientation includes the green lamp 52B, the yellow lamp 52Y, and the red lamp 52R vertically arranged.

There is also the traffic light 50 in which the traffic light body 51 has an arrow lamp 53 added thereto. For example, when the red lamp 52R is ON, the arrow lamp 53 allows vehicles to travel in a specific direction indicated by the arrow. In the traffic light 50 with the arrow lamp 53, the position of the arrow lamp 53 with respect to the red lamp 52R in the traffic light body 51 disposed in the horizontal orientation differs from that in the traffic light body 51 disposed in the vertical orientation.

Recognition of the traffic light 50 including the arrow lamp 53 will be described in detail later on below.

Various information recognized by the image recognition_ECU 13 is output as driving environment information to the driving_ECU 14.

The driving_ECU 14 is a control unit for controlling the overall operation of the driving assistance apparatus 1.

The driving_ECU 14 is coupled to various control units, such as an engine control unit (E/G_ECU) 22, a transmission control unit (T/M_ECU) 23, a brake control unit (BK_ECU) 24, and a power steering control unit (PS_ECU) 25 via an in-vehicle communication network, such as a controller area network (CAN).

A throttle actuator 32 for an electronically controlled throttle is coupled to the output side of the E/G_ECU 22. Various sensors, including an accelerator sensor (not illustrated), are coupled to the input side of the E/G_ECU 22.

The E/G_ECU 22 performs drive control on the throttle actuator 32 on the basis of a control signal from the driving_ECU 14 or detection signals from various sensors. The E/G_ECU 22 thus regulates the intake air volume of the engine to generate a desired engine output. The E/G_ECU 22 outputs an accelerator opening degree signal and other signals detected by various sensors to the driving_ECU 14.

A hydraulic control circuit 33 is coupled to the output side of the T/M_ECU 23. Various sensors, including a shift position sensor (not illustrated), are coupled to the input side of the T/M_ECU 23. The T/M_ECU 23 performs hydraulic control on the hydraulic control circuit 33 on the basis of an engine torque signal estimated by the E/G_ECU 22 and detection signals from various sensors. The T/M_ECU 23 thus operates, for example, frictional engagement elements and pulleys in an automatic transmission to change the engine output at a desired transmission gear ratio. The T/M_ECU 23 outputs a shift position signal and other signals detected by various sensors to the driving_ECU 14.

A brake actuator 34 for regulating the pressure of brake fluid output to a brake wheel cylinder in each wheel is coupled to the output side of the BK_ECU 24. Various sensors, such as a brake pedal sensor, a yaw rate sensor, a forward and backward acceleration sensor, and a vehicle speed sensor (not illustrated), are coupled to the input side of the BK_ECU 24.

The BK_ECU 24 performs drive control on the brake actuator 34 on the basis of a control signal from the driving_ECU 14 or detection signals from various sensors. The BK_ECU 24 thus appropriately generates a brake force for each wheel to perform, for example, forced braking control and yaw rate control on the vehicle M. The BK_ECU 24 outputs signals, such as a braking operation state signal, a yaw rate signal, a forward and backward acceleration signal, and a vehicle speed signal detected by various sensors to the driving_ECU 14.

An electric power steering motor 35 is coupled to the output side of the PS_ECU 25. The electric power steering motor 35 applies a steering torque produced by rotation of the motor to a steering mechanism. Various sensors, such as a steering torque sensor and a steering angle sensor, are coupled to the input side of the PS_ECU 25.

The PS_ECU 25 performs drive control on the electric power steering motor 35 on the basis of a control signal from the driving_ECU 14 or detection signals from various sensors. The PS_ECU 25 thus generates a steering torque for the steering mechanism. The PS_ECU 25 outputs signals, such as a steering torque signal and a steering angle signal, detected by various sensors to the driving_ECU 14.

The driving_ECU 14 provides the following driving modes: a manual driving mode, a first driving control mode and a second driving control mode for driving control, and an evacuation mode. The driving_ECU 14 can selectively switch the driving modes from one to another.

Here, the manual driving mode is a driving mode in which a driver who drives the vehicle M is to hold the steering wheel. The manual driving mode is a driving mode in which the vehicle M is driven in accordance a driver's driving operation, such as a steering operation, an accelerator operation, or a braking operation.

The first driving control mode is also a driving mode in which the driver is to hold the steering wheel. That is, the first driving control mode is a so-called semi-autonomous driving mode in which, for example, adaptive cruise control (ACC), active lane keep centering (ALKC) control, and active lane keep bouncing control are appropriately combined while the driver's driving operation is reflected.

The adaptive cruise control is basically performed on the basis of driving environment information received from the image recognition_ECU 13. That is, the adaptive cruise control is performed on the basis of, for example, information about preceding vehicles included in the driving environment information.

The active lane keep centering control and the active lane keep bouncing control are performed on the basis of, for example, driving environment information received from the image recognition_ECU 13. That is, the active lane keep centering control and the active lane keep bouncing control are performed on the basis of, for example, information about lanes and traffic lines included in the driving environment information.

The second driving control mode is an autonomous driving mode in which the vehicle M is driven by appropriately combining, for example, the adaptive cruise control, the active lane keep centering control, and the active lane keep bouncing control without the driver holding the steering wheel, operating the accelerator, or operating the brakes.

The evacuation mode is a mode for automatically stopping the vehicle M on the side strip or the like if, for example, driving in the second driving control mode cannot continue and the driving operation cannot be handed over to the driver (i.e., if transition to the manual driving mode or the first driving control mode fails).

In the driving modes described above, the driving_ECU 14 appropriately performs emergency braking (or autonomous emergency braking (AEB)) control on an obstacle, such as a vehicle, that is highly likely to collide with the vehicle M.

If determining that it is difficult to avoid collision with an obstacle by using the emergency braking control, the driving_ECU 14 can perform emergency steering control for avoiding collision with the obstacle instead of, or in combination with, the emergency braking control.

The emergency braking control and the emergency steering control are basically performed on the basis of driving environment information received from the image recognition_ECU 13. That is, the emergency braking control and the emergency steering control are performed on the basis of, for example, information about obstacles, such as preceding vehicles and parked vehicles, included in the driving environment information.

For example, when the second driving control mode is selected, the driving_ECU 14 can perform automatic stop control or automatic start control for automatically stopping or starting the vehicle M in accordance with the lighting state of the traffic light.

The automatic stop control and the automatic start control for the traffic light are basically performed on the basis of driving environment information received from the image recognition_ECU 13. That is, the driving_ECU 14 performs the automatic stop control and the automatic start control for the traffic light on the basis of, for example, traffic light recognition information included in the driving environment information.

When a mode other than the second driving control mode is selected, the driving_ECU 14 can inform the driver of information, such as the lighting state of the traffic light.

Details of traffic light recognition performed in the image recognition_ECU 13 will now be described.

Figure 6:
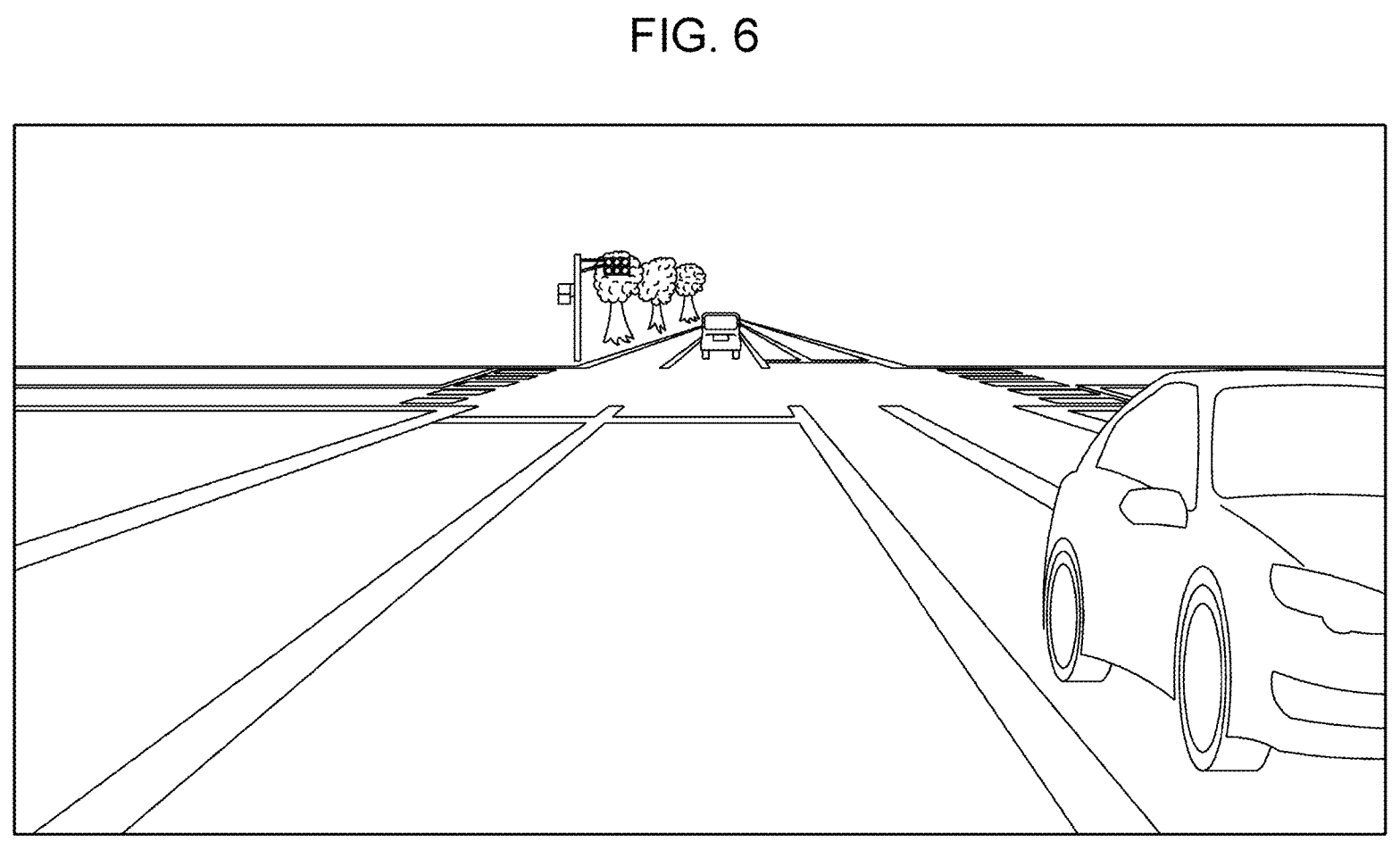

In a traffic light recognition process, the image recognition_ECU 13 detects, for example, a lighting region in a traffic light body on a color image (see, e.g., FIG. 6) captured by the main camera 11a. For example, the image recognition_ECU 13 detects a high-luminance region of green, yellow, or red on the color image as a lighting region.

When detecting the lighting region, the image recognition_ECU 13 can refer to, for example, range image information generated by the IPU 12. By referring to the range image information, the image recognition_ECU 13 can detect a high-luminance region at a predetermined height or more above the road surface as a lighting region in the traffic light body.

The image recognition_ECU 13 detects a lamp in an ON state among multiple lamps (e.g., three lamps) arranged in the traffic light body.

Detection of such a lamp is made, for example, on the basis of a lighting region. For example, on the assumption that the lighting region detected on the image coincides with a lighting portion of a lamp, the image recognition_ECU 13 detects a lighting portion in the ON state in the traffic light body. Also, the image recognition_ECU 13 estimates the dimensions of the entire lamp on the basis of the lighting portion detected. For example, on the basis of the dimensional ratio between a lighting portion and a frame portion (housing) of a typical lamp, the image recognition_ECU 13 calculates the dimensions of a rectangular frame portion surrounding the lighting portion. The image recognition_ECU 13 thus estimates the dimensions of the entire lamp including the lighting portion and the frame portion.

The image recognition_ECU 13 sets lamp search areas at positions on the image that are horizontally and vertically aligned with the detected lamp. These lamp search areas are areas used to search for other lamps in an OFF state in the traffic light body. Accordingly, the image recognition_ECU 13 sets the dimensions of each lamp search area on the image to be the same dimensions as the lamp in the ON state. Also, the image recognition_ECU 13 specifies the relative position of each lamp search area with respect to the lamp in the ON state in accordance with the lighting color of the lighting region.

Figure 9:
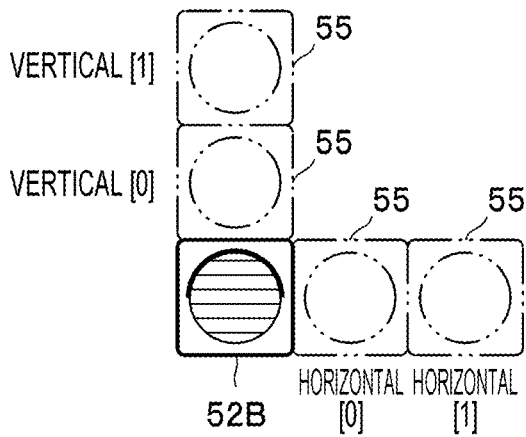

For example, as illustrated in FIG. 7, when the green lamp 52B is ON in the traffic light body 51 disposed in the horizontal orientation, other lamps in the OFF state (the yellow lamp 52Y and the red lamp 52R) are both to the right of the green lamp 52B. On the other hand, for example, as illustrated in FIG. 8, when the green lamp 52B is ON in the traffic light body 51 disposed in the vertical orientation, other lamps in the OFF state (the yellow lamp 52Y and the red lamp 52R) are both above the green lamp 52B. On the basis of the legal layout of the lamps 52 in each traffic light body 51, the image recognition_ECU 13 sets two lamp search areas 55 each to the right of and above the green lamp 52B on the image (see FIG. 9).

Also, for example, as illustrated in FIG. 10, when the yellow lamp 52Y is ON in the traffic light body 51 disposed in the horizontal orientation, other lamps in the OFF state (the green lamp 52B and the red lamp 52R) are to the left and right of the yellow lamp 52Y. On the other hand, for example, as illustrated in FIG. 11, when the yellow lamp 52Y is ON in the traffic light body 51 disposed in the vertical orientation, other lamps in the OFF state (the green lamp 52B and the red lamp 52R) are below and above the yellow lamp 52Y. On the basis of the legal layout of the lamps 52 in each traffic light body 51, the image recognition_ECU 13 sets one lamp search area 55 each to the right and left of and above and below the yellow lamp 52Y on the image (see FIG. 12).

Figure 13:
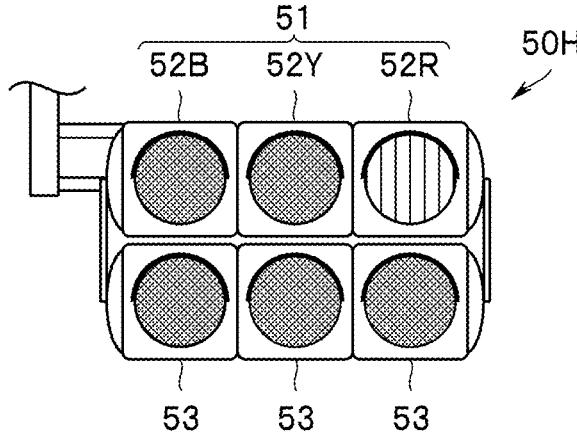
Figure 14:
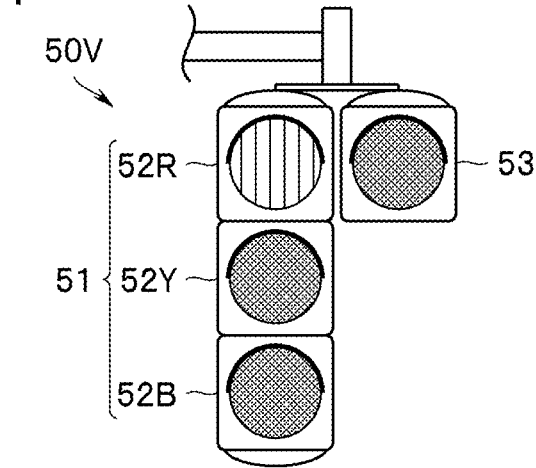
Figure 15:
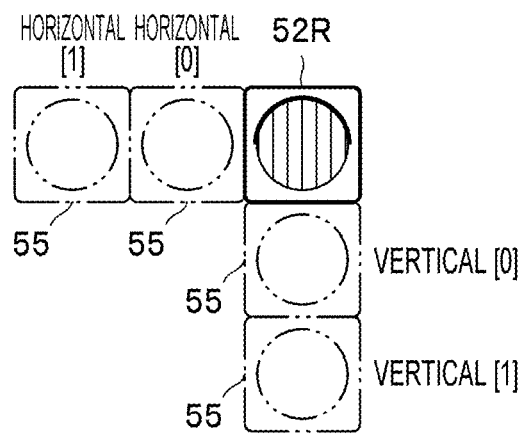

Also, for example, as illustrated in FIG. 13, when the red lamp 52R is ON in the traffic light body 51 disposed in the horizontal orientation, other lamps in the OFF state (the green lamp 52B and the yellow lamp 52Y) are both to the left of the red lamp 52R. On the other hand, for example, as illustrated in FIG. 14, when the red lamp 52R is ON in the traffic light body 51 disposed in the vertical orientation, other lamps in the OFF state (the green lamp 52B and the yellow lamp 52Y) are both below the red lamp 52R. On the basis of the legal layout of the lamps 52 in each traffic light body 51, the image recognition_ECU 13 sets two lamp search areas 55 each to the left of and below the red lamp 52R on the image (see FIG. 15).

The image recognition_ECU 13 sets coordinate points for black region determination (hereinafter referred to as "black region determination coordinate points") in each of the lamp search areas 55.

Generally, the frame portion of each lamp 52 is painted in a relatively bright color, such as light gray or white. On the other hand, the lighting portion of each lamp 52 in the OFF state is darker than the frame portion and has a color close to black. Therefore, the luminance of the frame portion on the image is relatively higher than the luminance of the lighting portion in the OFF state. In other words, the lighting portion in the OFF state forms a black region darker than the frame portion on the image. To determine such a black region, the image recognition_ECU 13 sets black region determination coordinate points at the edge and in the center of each lamp search area 55.

For example, the image recognition_ECU 13 of the present embodiment sets black region determination coordinate points $c0$, $c1$, $c2$, and $c3$ near four corners of the lamp search area 55. The image recognition_ECU 13 also sets, for example, five black region determination coordinate points $c4$, $c5$, $c6$, $c7$, and $c8$ in the center of the lamp search area 55.

Figure 16:
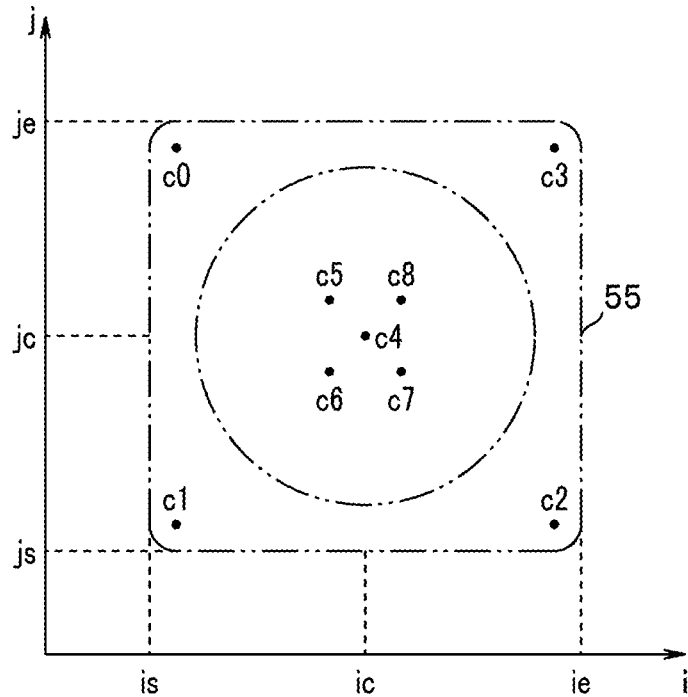
FIG. 16 is an explanatory diagram illustrating coordinate points that are set for black region determination in each search area.

For example, when, as illustrated in FIG. 16, a horizontal coordinate in the lamp search area 55 is defined as "i" and a vertical coordinate in the lamp search area 55 is defined as "j", the coordinate points in each lamp search area 55 can be expressed as follows.

$c0$: $(is+\alpha, je-\alpha)$
$c1$: $(is+\alpha, js+\alpha)$
$c2$: $(ie-\alpha, js+\alpha)$
$c3$: $(ie-\alpha, je-\alpha)$
$c4$: $(ic, jc)$
$c5$: $(ic-\alpha, jc+\alpha)$
$c6$: $(ic-\alpha, jc-\alpha)$
$c7$: $(ic+\alpha, jc-\alpha)$
$c8$: $(ic+\alpha, jc+\alpha)$ Here, "is" indicates the starting point of the lamp search area 55 in the i-axis direction, "ie" indicates the end point of the lamp search area 55 in the i-axis direction, and "ic" indicates the center point of the lamp search area 55 in the i-axis direction. Similarly, "js" indicates the starting point of the lamp search area 55 in the j-axis direction, "je" indicates the end point of the lamp search area 55 in the j-axis direction, and "jc" indicates the center point of the lamp search area 55 in the j-axis direction. Note that "α" is a predetermined value representing the number of pixels (e.g., one or more micro-pixels) on the image.

After setting the black region determination coordinate points, the image recognition_ECU 13 determines whether a black region exists in the center of the lamp search area 55 on the basis of, for example, the first to fourth conditions described below.

(First Condition)

The first condition is that a neighboring luminance Ln exceeds a first threshold Lth1. That is, for example, the image recognition_ECU 13 calculates the average of luminances at the black region determination coordinate points c0 to c3 as the neighboring luminance Ln. If the neighboring luminance Ln is less than or equal to the first threshold Lth1, the image recognition_ECU 13 eliminates the lamp search area 55 currently being processed from the lamp search areas 55 to be searched. This allows the image recognition_ECU 13 to avoid searching for a lamp under too dark conditions, such as under an elevated structure or at night. This is because if the neighboring luminance is too low, it is difficult to distinguish between an edge formed by the frame portion and a center formed by the lighting portion by using luminances.

(Second Condition)

The second condition is that a central luminance Lc does not exceed a second threshold Lth2 (Lth2≤Lth1). That is, for example, the image recognition_ECU 13 calculates the average of luminances at the black region determination coordinate points c4 to c8 as the central luminance Lc. Then, if the central luminance Lc exceeds the second threshold Lth2, the image recognition_ECU 13 determines that no black region exists in the center of the lamp search area 55.

(Third Condition)

The third condition is that the neighboring luminance Ln is higher than the central luminance Lc. That is, in most traffic light bodies, as described above, the frame portions of lamps have a bright color, such as white, and the lighting portions of lamps in the OFF state have a dark color, such as black. Therefore, if the neighboring luminance Ln is less than or equal to the central luminance Lc, the image recognition_ECU 13 determines that no black region exists in the center of the lamp search area 55.

(Fourth Condition)

The fourth condition is that the RGB luminance ratio in the center of the lamp search area 55 is within the range of RGB luminance ratios set in accordance with, for example, the camera specifications. That is, in the image recognition_ECU 13, for example, the range of RGB luminance ratios in images captured when the lighting portion is OFF is set in advance in accordance with, for example, the camera specifications. Therefore, if the RGB luminance ratio in the center of the lamp search area 55 is outside the range of RGB luminance ratios set in accordance with, for example, the camera specifications, the image recognition_ECU 13 determines that no black region exists in the center of the lamp search area 55.

It is desirable that this black region determination for each lamp search area 55 on the image be performed on more than or equal to a set number of frames (e.g., three or more frames).

For example, when the proportion of frames where all the first to fourth conditions are satisfied is greater than or equal to a predetermined value, the image recognition_ECU 13 detects the lamp search area 55 as the area where a black region exists. In other words, the image recognition_ECU 13 detects the lamp search area 55 that is determined to be an area where a black region exists, as an area where the lamp in the OFF state exists.

Also, the image recognition_ECU 13 determines the orientation of the traffic light body including the lamp in the ON state on the basis of the arrangement of the detected lamps in the OFF state. In this determination, for example, the image recognition_ECU 13 compares the frequency at which the lamp in the OFF state is detected in the horizontal direction of the lamp in the ON state, with the frequency at which the lamp in the OFF state is detected in the vertical direction of the lamp in the ON state. Then, if the frequency of detection in the horizontal direction is higher than the frequency of detection in the vertical direction, the image recognition_ECU 13 determines that the traffic light body including the lamp in the ON state is disposed in the horizontal orientation. On the other hand, if the frequency of detection in the horizontal direction is lower than the frequency of detection in the vertical direction, the image recognition_ECU 13 determines that the traffic light body including the lamp in the ON state is disposed in the vertical orientation.

The orientation of the traffic light body can also be determined on the basis of how the lighting region moves when lighting of the lamp is switched. For example, if the lighting region moves in the horizontal direction when the lamp in the ON state is switched, the image recognition_ECU 13 determines that the traffic light body including the lamp in the ON state is disposed in the horizontal orientation. On the other hand, for example, if the lighting region moves in the vertical direction when the lamp in the ON state is switched, the image recognition_ECU 13 determines that the traffic light body including the lamp in the ON state is disposed in the vertical orientation.

After determining the orientation of the traffic light body, the image recognition_ECU 13 sets search areas (arrow search areas) for arrow lamps added to the traffic light body. The arrow search areas are set, for example, with reference to the red lamp 52R. For example, if the red lamp 52R is detected as the lamp in the ON state, the image recognition_ECU 13 sets the arrow search areas 56 with reference to the red lamp 52R in the ON state. Also, for example, if the green lamp 52B or the yellow lamp 52Y is detected as the lamp in the ON state, the image recognition_ECU 13 sets the arrow search areas 56 when the red lamp 52R turns ON.

Figure 19:
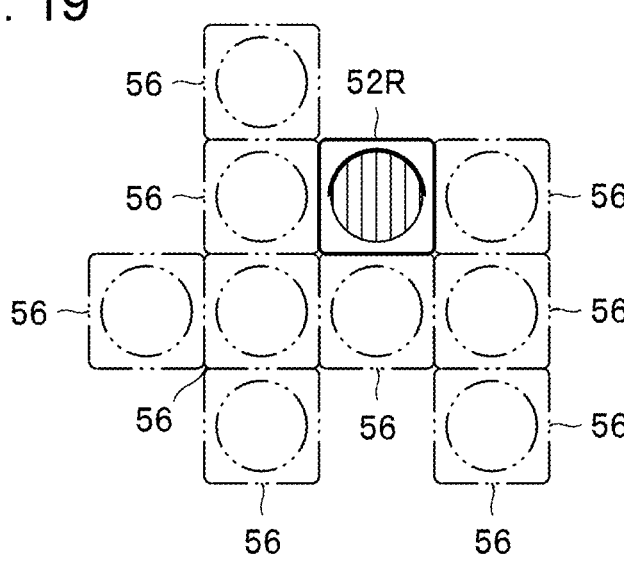
FIG. 19 is an explanatory diagram illustrating arrow lamp search areas for a traffic light whose orientation cannot be determined.

If it has not been determined whether the traffic light body 51 is disposed in the horizontal or vertical orientation, the image recognition_ECU 13 sets the arrow search areas 56, for example, at nine points around the red lamp 52R as illustrated in FIG. 19.

Figure 17:
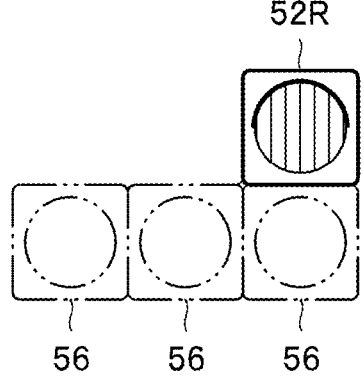
FIG. 17 is an explanatory diagram illustrating arrow lamp search areas for a traffic light determined to be horizontal.

On the other hand, if it has been determined that the traffic light body 51 is disposed in the horizontal orientation, the image recognition_ECU 13 sets, for example, three arrow search areas 56 arranged in the horizontal direction below the red lamp 52R, as illustrated in FIG. 17. That is, the image recognition_ECU 13 narrows down the nine arrow search areas 56 around the red lamp 52R to fewer arrow search areas 56. This is because when the traffic light body 51 is disposed in the horizontal orientation, it is difficult to assume that the arrow lamp 53 is to the right or left of or above the red lamp 52R.

Figure 18:
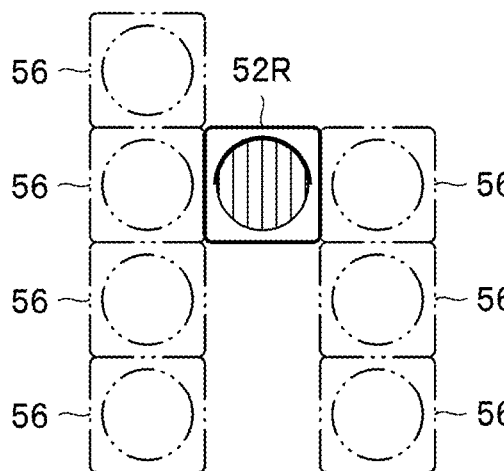
FIG. 18 is an explanatory diagram illustrating arrow lamp search areas for a traffic light determined to be vertical.

If it has been determined that the traffic light body 51 is disposed in the vertical orientation, the image recognition_ECU 13 sets, for example, four arrow search areas arranged in the vertical direction to the left of the red lamp 52R, as illustrated in FIG. 18. Additionally, the image recognition_ECU 13 sets three arrow search areas arranged in the vertical direction to the right of the red lamp 52R. That is, the image recognition_ECU 13 narrows down the nine arrow search areas 56 around the red lamp 52R to fewer arrow search areas 56. This is because when the traffic light body 51 is disposed in the vertical orientation, it is difficult to assume that the arrow lamp 53 is above or below the red lamp 52R.

Figure 20:
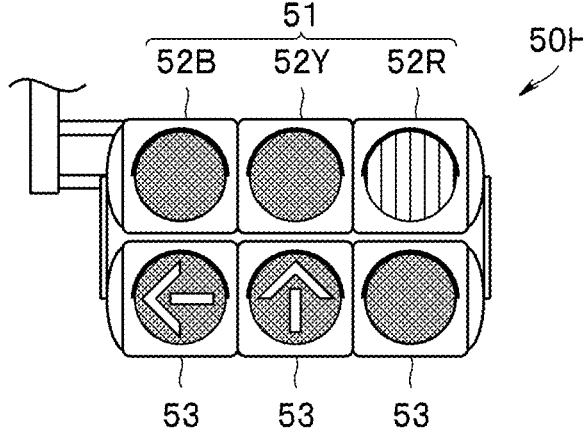
Figure 21:
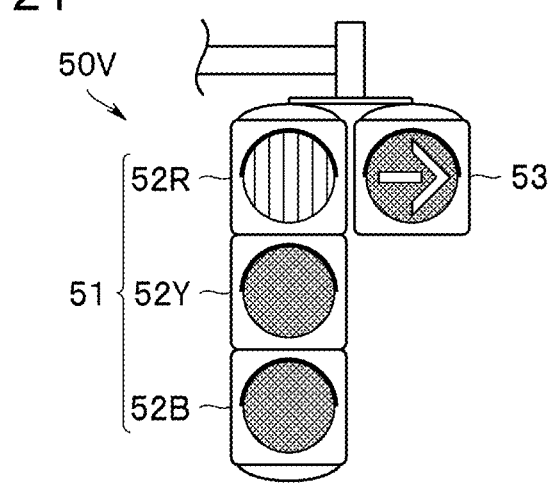

Then, the image recognition_ECU 13 searches for the arrow lamps 53 attached to the traffic light body 51. That is, the image recognition_ECU 13 searches for the arrow lamps 53 (see, e.g., FIGS. 20 and 21) that are ON concurrently with the lighting of the red lamp 52R. This search for the arrow lamps 53 is performed for each of the arrow search areas 56 set.

As described above, in the present embodiment, the image recognition_ECU 13 corresponds to an example of a lighting region detector, a first lamp detector, a first search area setter, a second lamp detector, an orientation determiner, and a second search area setter.

A traffic light recognition process performed in the image recognition_ECU 13 will now be described with reference to the flowchart of a traffic light recognition routine illustrated in FIG. 2. This routine is repeatedly executed at set time intervals in the image recognition_ECU 13.

When the routine starts, the image recognition_ECU 13 checks whether a lighting portion in the ON state has been detected in front of the vehicle M on the road. That is, for example, the image recognition_ECU 13 checks whether a lighting region (i.e., lighting portion) has been detected on a color image captured by the main camera 11a.

If determining in step S101 that the lighting portion has not been detected (NO in step S101), the image recognition_ECU 13 exits the routine.

On the other hand, if determining in step S101 that the lighting portion has been detected (YES in step S101), the image recognition_ECU 13 proceeds to step S102.

In step S102, the image recognition_ECU 13 checks whether the lighting portion in the ON state detected this time and the lighting portion detected the previous time are in the same traffic light.

Here, the determination as to whether the current lighting portion and the previous lighting portion are in the same traffic light can be made on the basis of, for example, range images generated in the IPU 12. That is, the image recognition_ECU 13 estimates the relative distance between the current lighting portion and the previous lighting portion in real space on the basis of the range image in each frame. If the relative distance between the lighting portions in real space is less than a set distance (e.g., 1 m), the image recognition_ECU 13 can determine that the lighting portions are in the same traffic light.

If determining in step S102 that the current lighting portion and the previous lighting portion are not in the same traffic light (NO in step S102), the image recognition_ECU 13 proceeds to step S104.

On the other hand, if determining in step S102 that the current lighting portion and the previous lighting portion are in the same traffic light (YES in step S102), the image recognition_ECU 13 proceeds to step S103.

In step S103, the image recognition_ECU 13 checks whether the lighting color of the lighting portion detected this time has changed from the lighting color of the lighting portion detected the previous time.

If determining in step S103 that the lighting color of the lighting portion detected this time has changed from the previous one (YES in step S103), the image recognition_ECU 13 proceeds to step S106.

On the other hand, if determining in step S103 that the lighting color of the lighting portion detected this time has not changed from the previous one (NO in step S103), the image recognition_ECU 13 proceeds to step S104.

Figure 3:
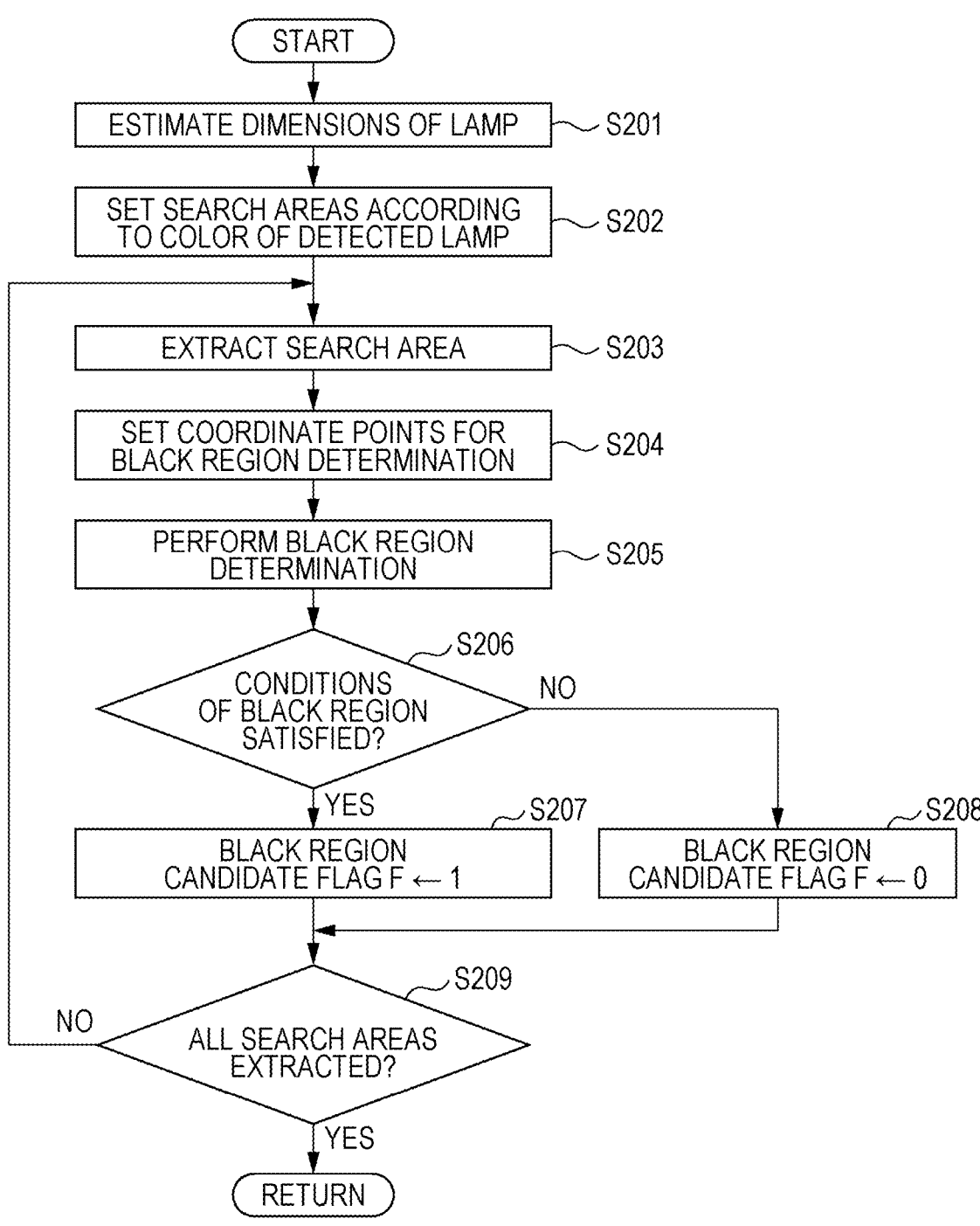
FIG. 3 is a flowchart illustrating a black region determination subroutine.

When proceeding from step S102 or step S103 to step S104, the image recognition_ECU 13 performs black region determination on the area around the lighting portion currently detected. This black region determination is executed, for example, in accordance with the flowchart of a black region determination subroutine illustrated in FIG. 3.

When the subroutine starts, the image recognition_ECU 13 estimates, in step S201, the dimensions of the lamp on the image on the basis of the lighting portion currently detected. That is, the image recognition_ECU 13 calculates the dimensions of the frame portion on the image on the basis of the dimensional ratio between a lighting portion and a frame portion in a typical lamp. The image recognition_ECU 13 thus estimates the dimensions of the lamp.

In step S202, the image recognition_ECU 13 sets search areas (black region search areas) on the image in accordance with the lighting color of the lighting portion currently detected. For example, if the lamp currently detected is the green lamp 52B, the image recognition_ECU 13 sets two lamp search areas 55 each to the right of and above the green lamp 52B (see FIG. 9). Also, for example, if the lamp currently detected is the yellow lamp 52Y, the image recognition_ECU 13 sets one lamp search area 55 each to the right and left of and above and below the yellow lamp 52Y (see FIG. 12). Also, for example, if the lamp currently detected is the red lamp 52R, the image recognition_ECU 13 sets two lamp search areas 55 each to the left of and below the red lamp 52R (see FIG. 15).

In step S203, the image recognition_ECU 13 extracts, from the lamp search areas 55 set in step S202, one lamp search area 55 that has not been extracted.

In step S204, the image recognition_ECU 13 sets black region determination coordinate points c0 to c8 for the lamp search area 55 extracted (see FIG. 16).

In step S205, the image recognition_ECU 13 performs black region determination on the basis of the luminance values at the coordinate points c0 to c8 for black region determination on the image. That is, the image recognition_ECU 13 performs black region determination by using the first to fourth conditions described above. In the present embodiment, the black region determination refers to determining whether a black region exists in the center of the lamp search area 55 currently extracted.

In step S206, the image recognition_ECU 13 checks whether the luminance values at the coordinate points c0 to c8 in the lamp search area 55 currently extracted satisfy the first to fourth conditions.

If determining in step S206 that the luminance values at the coordinate points c0 to c8 satisfy all the first to fourth conditions (YES in step S206), the image recognition_ECU 13 proceeds to step S207.

When proceeding from step S206 to step S207, the image recognition_ECU 13 sets a black region candidate flag F to "1". The black region candidate flag F indicates that a black region is highly likely to exist in the lamp search area currently extracted.

On the other hand, if determining in step S206 that the luminance values at the coordinate points c0 to c8 do not satisfy one or more of the first to fourth conditions (NO in step S207), the image recognition_ECU 13 proceeds to step S208.

When proceeding from step S206 to step S208, the image recognition_ECU 13 clears the black region candidate flag F to "0".

When proceeding from step S207 or step S208 to step S209, the image recognition_ECU 13 checks whether all the lamp search areas have been extracted.

If determining in step S209 that not all the lamp search areas have been extracted (NO in step S209), the image recognition_ECU 13 returns to step S203.

On the other hand, if determining in step S209 that all the lamp search areas have been extracted (YES in step S209), the image recognition_ECU 13 exits the subroutine.

Figure 2:
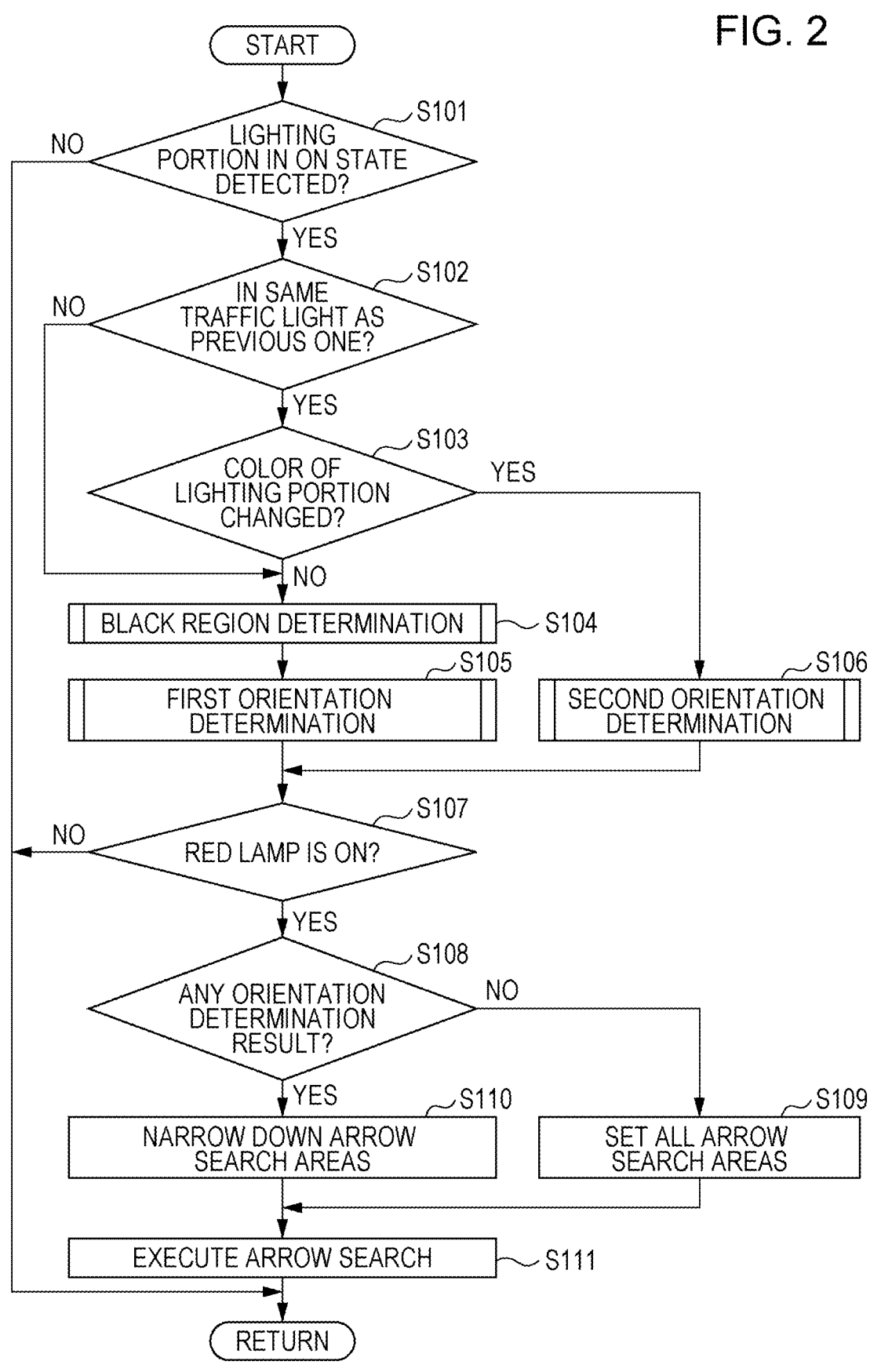
FIG. 2 is a flowchart illustrating a traffic light recognition routine.

When proceeding from step S104 to step S105 in the main routine illustrated in FIG. 2, the image recognition_ECU 13 performs orientation determination for the traffic light body including the lamp currently detected. This orientation determination is executed, for example, in accordance with the flowchart of a first orientation determination subroutine illustrated in FIG. 4.

When the subroutine starts, the image recognition_ECU 13 checks, in step S301, whether the current traffic light is one that has changed from a traffic light recognized up to the previous frame.

Here, the current traffic light refers to a traffic light that is to be recognized in association with the nearest lamp currently detected in front of the vehicle M on the road. The traffic light recognized up to the previous frame refers to a traffic light that is to be recognized in association with the nearest lamp detected up to the previous frame in front of the vehicle M on the road. The nearest lamp in front of the vehicle M on the road changes every time the vehicle M passes a traffic light. This means that the determination as to whether the traffic light has changed can be made, for example, on the basis of whether the nearest lamp in front of the vehicle M on the road has changed.

If determining in step S301 that the traffic light has not changed (NO in step S301), the image recognition_ECU 13 proceeds to step S303.

On the other hand, if determining in step S301 that the traffic light has changed (YES in step S301), the image recognition_ECU 13 proceeds to step S302.

In step S302, the image recognition_ECU 13 clears both a "horizontal" determination point P1 and a "vertical" determination point P2 for the current traffic light to "0". Here, the "horizontal" determination point P1 is a point indicating that the current traffic light is highly likely to be a traffic light in which lamps are arranged in the horizontal direction. Also, the "vertical" determination point P2 is a point indicating that the current traffic light is highly likely to be a traffic light in which lamps are arranged in the vertical direction.

When proceeding from step S301 or step S302 to step S303, the image recognition_ECU 13 checks whether the black region candidate flags F for the lamp search areas set in the horizontal direction of the lamp currently detected are both "1".

If determining in step S303 that one or both of the black region candidate flags F for the horizontal direction are not "1" (NO in step S303), the image recognition_ECU 13 proceeds to step S305.

On the other hand, if determining in step S303 that the black region candidate flags F for the horizontal direction are both "1" (YES in step S303), the image recognition_ECU 13 proceeds to step S304.

When proceeding from step S303 to step S304, the image recognition_ECU 13 increments the "horizontal" determination point P1 (P1←P1+1) and proceeds to step S305. The value by which the "horizontal" determination point P1 is incremented is not limited to "1" and can be varied depending on, for example, the reliability of information.

When proceeding from step S303 or step S304 to step S305, the image recognition_ECU 13 checks whether the black region candidate flags F for the lamp search areas set in the vertical direction of the lamp currently detected are both "1".

If determining in step S305 that one or both of the black region candidate flags F for the vertical direction are not "1" (NO in step S305), the image recognition_ECU 13 proceeds to step S307.

On the other hand, if determining in step S305 that the black region candidate flags F for the vertical direction are both "1" (YES in step S305), the image recognition_ECU 13 proceeds to step S306.

When proceeding from step S305 to step S306, the image recognition_ECU 13 increments the "vertical" determination point P2 (P2←P2+1) and proceeds to step S307. The value by which the "vertical" determination point P2 is incremented is not limited to "1" and can be varied depending on, for example, the reliability of information.

When proceeding from step S305 or step S306 to step S307, the image recognition_ECU 13 checks whether the absolute value of the difference between the "horizontal" determination point P1 and the "vertical" determination point P2 (i.e., $|P1-P2|$) is greater than or equal to a preset threshold (e.g., three).

If determining in step S307 that the absolute value of the difference between the points $|P1-P2|$ is less than the threshold (NO in step S307), the image recognition_ECU 13 proceeds to step S308.

When proceeding from step S307 to step S308, the image recognition_ECU 13 determines that the orientation of the traffic light to be currently recognized cannot be determined. The image recognition_ECU 13 then exits the subroutine.

On the other hand, if determining in step S307 that the absolute value of the difference between the points $|P1-P2|$ is greater than or equal to the threshold (YES in step S307), the image recognition_ECU 13 proceeds to step S309.

In step S309, the image recognition_ECU 13 checks whether the "horizontal" determination point P1 is greater than the "vertical" determination point P2.

If determining in step S309 that the "horizontal" determination point P1 is greater than the "vertical" determination point P2 (YES in step S309), the image recognition_ECU 13 proceeds to step S310.

When proceeding from step S309 to step S310, the image recognition_ECU 13 determines that the traffic light to be currently recognized is a horizontal traffic light. The image recognition_ECU 13 then exits the subroutine.

On the other hand, if determining in step S309 that the "horizontal" determination point P1 is less than or equal to the "vertical" determination point P2 (NO in step S309), the image recognition_ECU 13 proceeds to step S311.

When proceeding from step S309 to step S311, the image recognition_ECU 13 determines that the traffic light to be currently recognized is a vertical traffic light. The image recognition_ECU 13 then exits the subroutine.

Figure 5:
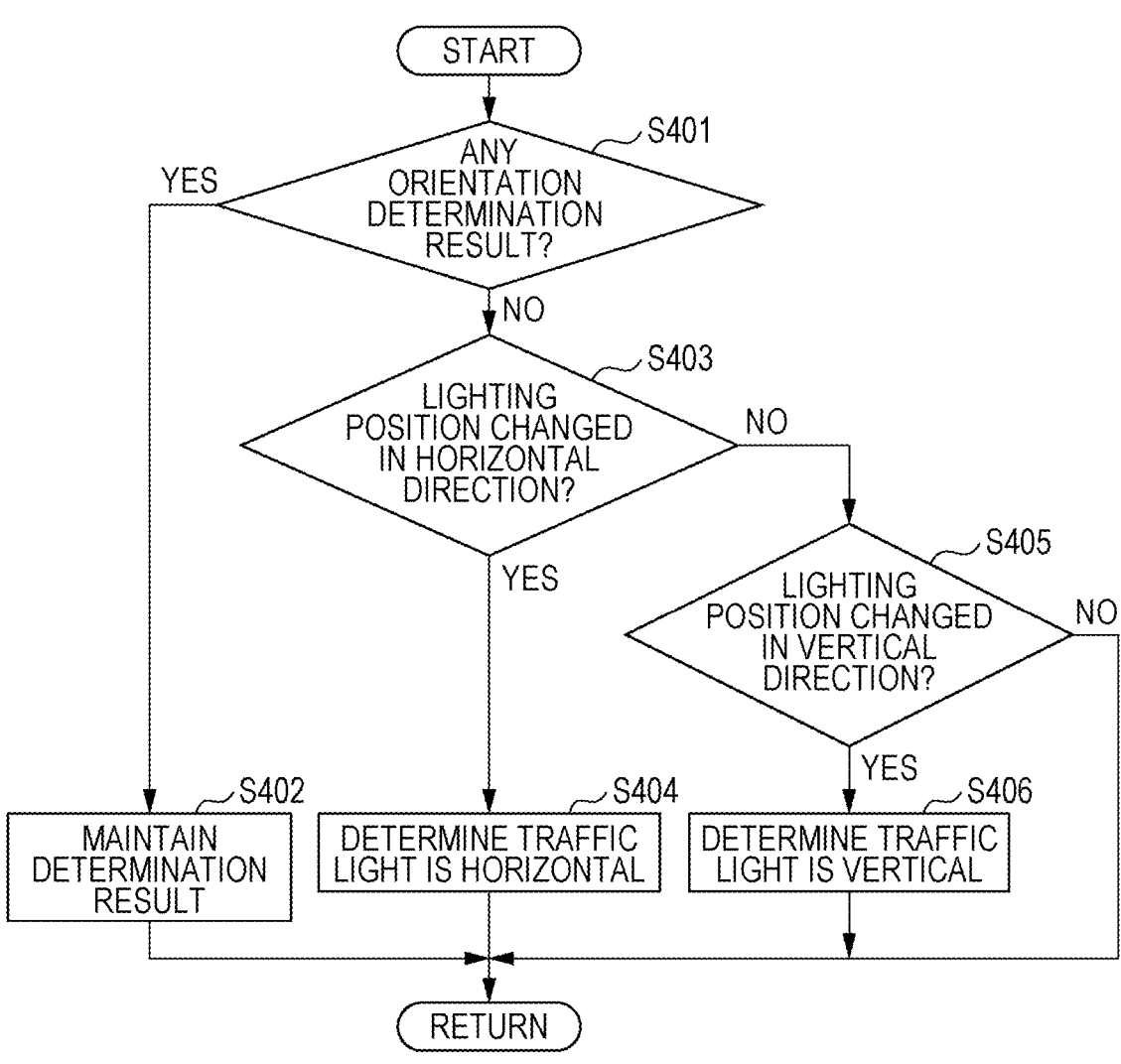
FIG. 5 is a flowchart illustrating a second orientation determination subroutine.

When proceeding from step S103 to step S106 in the main routine illustrated in FIG. 2, the image recognition_ECU 13 performs orientation determination for the traffic light body including the lamp currently detected. This orientation determination is executed, for example, in accordance with the flowchart of a second orientation determination subroutine illustrated in FIG. 5.

When the subroutine starts, the image recognition_ECU 13 checks, in step S401, whether there is any result of orientation determination (hereinafter referred to as "orientation determination result") for the current traffic light. The case where there is an orientation determination result for the current traffic light is, for example, the case where an orientation determination result from step S104 and step S105 exists before the lighting color of the lighting portion in the ON state changes.

If determining in step S401 that there is an orientation determination result for the current traffic light (YES in step S401), the image recognition_ECU 13 proceeds to step S402.

In step S402, the image recognition_ECU 13 exits the subroutine while maintaining the current orientation determination result.

On the other hand, if determining in step S401 that there is no orientation determination result for the current traffic light (NO in step S401), the image recognition_ECU 13 proceeds to step S403.

In step S403, the image recognition_ECU 13 checks whether the lighting position of the lamp in real space has changed in the horizontal direction when the lighting color has changed. That is, the image recognition_ECU 13 checks whether the lighting position of the lamp has changed in the horizontal direction when the lamp in the ON state has been switched.

If determining in step S403 that the lighting position has changed in the horizontal direction (YES in step S403), the image recognition_ECU 13 proceeds to step S404.

In step S404, the image recognition_ECU 13 determines that the traffic light to be currently recognized is a horizontal traffic light. The image recognition_ECU 13 then exits the subroutine.

On the other hand, if determining in step S403 that the lighting position has not changed in the horizontal direction (NO in step S403), the image recognition_ECU 13 proceeds to step S405.

In step S405, the image recognition_ECU 13 checks whether the lighting position of the lamp in real space has changed in the vertical direction when the lighting color has changed. That is, the image recognition_ECU 13 checks whether the lighting position of the lamp has changed in the vertical direction when the lamp in the ON state has been switched.

If determining in step S405 that the lighting position has changed in the vertical direction (YES in step S405), the image recognition_ECU 13 proceeds to step S406.

In step S406, the image recognition_ECU 13 determines that the traffic light to be currently recognized is a vertical traffic light. The image recognition_ECU 13 then exits the subroutine.

On the other hand, if determining in step S405 that the lighting position has not changed in the vertical direction (NO in step S405), the image recognition_ECU 13 exits the subroutine.

When proceeding from step S105 or step S106 to step S107 in the main routine illustrated in FIG. 2, the image recognition_ECU 13 checks whether the lighting portion currently in the ON state is red. That is, the image recognition_ECU 13 checks whether the lamp currently in the ON state is a red lamp.

If determining in step S107 that the lighting portion currently in the ON state is not red (NO in step S107), the image recognition_ECU 13 exits the routine.

On the other hand, if determining in step S107 that the lighting portion currently in the ON state is red (YES in step S107), the image recognition_ECU 13 proceeds to step S108.

In step S108, the image recognition_ECU 13 checks whether there is any orientation determination result for the current traffic light. That is, the image recognition_ECU 13 checks whether an orientation determination result for the current traffic light is obtained in one or both of step S105 and step S106.

If determining in step S108 that no orientation determination result for the current traffic light is obtained (NO in step S108), the image recognition_ECU 13 proceeds to step S109.

In step S109, the image recognition_ECU 13 sets all arrow search areas around the red lamp currently in the ON state (see FIG. 19).

On the other hand, if determining in step S108 that an orientation determination result for the current traffic light is obtained (YES in step S108), the image recognition_ECU 13 proceeds to step S110.

In step S110, the image recognition_ECU 13 narrows down the arrow search areas to be set around the red lamp. That is, the image recognition_ECU 13 sets arrow search areas around the red lamp in accordance with the orientation determination result for the traffic light (see FIGS. 17 and 18).

When proceeding from step S109 or step S110 to step S111, the image recognition_ECU 13 searches each of the set arrow search areas for an arrow lamp in the ON state. The image recognition_ECU 13 then exits the routine.

In the embodiments described above, the image recognition_ECU 13 detects a lighting region in a traffic light body on a captured color image of the area in front of the vehicle M to detect a lamp in the ON state among lamps arranged in the traffic light body. Also, the image recognition_ECU 13 sets lamp search areas having the same dimensions as the lamp in the ON state at specific positions on the image that are horizontally and vertically aligned with the lamp in the ON state and are according to the lighting color of the lighting region. The image recognition_ECU 13 evaluates, for each of the lamp search areas, a luminance at the edge of the lamp search area and a luminance in the center of the lamp search area, and detects lamps in the OFF state arranged in the traffic light body. Moreover, the image recognition_ECU 13 determines whether the traffic light body is disposed in the horizontal or vertical orientation on the basis of the arrangement of the lamp in the ON state and the lamps in the OFF state. Then, in accordance with the determined orientation of the traffic light body, the image recognition_ECU 13 sets search areas used to search for arrow lamps attached to the traffic light body. It is thus possible to efficiently search for the lighting of arrow lamps.

That is, the image recognition_ECU 13 detects the lamp in the ON state on the assumption that the lighting region on the color image coincides with the lighting portion of the lamp. Thus, even when boundaries between the lamps arranged in the traffic light body are unclear on the image, the lamp in the ON state can be accurately detected.

The image recognition_ECU 13 sets lamp search areas at specific positions that are horizontally and vertically aligned with the lamp in the ON state and are according to the lighting color of the lamp in the ON state. This processing is performed by focusing on the fact that the order of arrangement of the lamps of different colors in the traffic light body 51 disposed in the horizontal orientation and the traffic light body 51 disposed in the vertical orientation is known. It is thus possible to efficiently search for the lighting of lamps in the OFF state included in the traffic light body.

The image recognition_ECU 13 evaluates luminance at the edge of the lamp search area and luminance in the center of the lamp search area for each of the lamp search areas, and detects the lamps in the OFF state in the traffic light body on the basis of each evaluation. This processing is performed by focusing on the fact that the lighting portion of the lamp in the OFF state is a black region with a luminance lower than that of the frame portion. Thus, even when boundaries between the lamps arranged in the traffic light body are unclear on the image, the lamps in the OFF state can be accurately detected.

The image recognition_ECU 13 further determines whether the traffic light body is disposed in the horizontal or vertical orientation on the basis of the arrangement of the lamp in the ON state and the lamps in the OFF state. By setting arrow search areas in accordance with the orientation of the traffic light body, unnecessary arrow search areas can be eliminated. It is thus possible to efficiently search for the lighting of arrow lamps.

In the embodiments described above, the image recognition_ECU 13, the driving_ECU 14, the E/G_ECU 22, the T/M_ECU 23, the BK_ECU 24, and the PS_ECU 25 are each constituted by a known microcomputer including a central processing unit (CPU), a random-access memory (RAN), a read-only memory (ROM), and a non-volatile storage, and its peripherals. Programs executed by the CPU and fixed data, such as data tables, are stored in the ROM in advance. All or some of the functions of the processor may be constituted by a logic circuit or an analog circuit, and processing of various programs may be implemented by an electronic circuit, such as a field-programmable gate array (FPGA).

The disclosure described in the embodiments is not limited to these embodiments, and various modifications can be made at the stage of implementation without departing from the spirit of the disclosure. The embodiments described above include the disclosure at various stages, and various disclosures may be extracted by appropriately combining constituent elements disclosed.

For example, even when some of all the constituent elements described in the embodiments are deleted, the configuration from which the constituent elements have been deleted can be extracted as the disclosure, as long as the problem stated can be solved and the advantageous effects stated can be achieved.

The traffic light recognizing apparatus according to the embodiments of the disclosure can efficiently search for the lighting of arrow lamps.

The image recognition_ECU 13 illustrated in FIG. 1 can be implemented by circuitry including at least one semiconductor integrated circuit such as at least one processor (e.g., a central processing unit (CPU)), at least one application specific integrated circuit (ASIC), and/or at least one field-programmable gate array (FPGA). At least one processor can be configured, by reading instructions from at least one machine readable tangible medium, to perform all or a part of functions of the image recognition_ECU 13. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A traffic light recognizing apparatus to be applied to a vehicle, the traffic light recognizing apparatus comprising:

an imager configured to perform a color imaging to capture an image of a driving environment in front of the vehicle;

a lighting region detector configured to detect a lighting region in a traffic light body of a traffic light on the image captured by the imager;

a first lamp detector configured to detect a lamp in an ON state among lamps arranged in the traffic light body based on the lighting region;

a first search area setter configured to set search areas having same dimensions as the lamp in the ON state at specific positions on the image that are horizontally and vertically aligned with the lamp in the ON state and are according to a lighting color of the lighting region;

a second lamp detector configured to evaluate, a luminance at an edge of each of the search areas and a luminance in a center of each of the search areas, and detect lamps in an OFF state among the lamps arranged in the traffic light body; and an orientation determiner configured to determine whether the traffic light body is disposed in a horizontal or vertical orientation based on an arrangement of the lamp in the ON state and the lamps in the OFF state.

2. The traffic light recognizing apparatus according to claim 1, further comprising a second search area setter configured to set a search area for an arrow lamp attached to the traffic light body in accordance with the orientation of the traffic light body.

3. The traffic light recognizing apparatus according to claim 1, wherein the orientation determiner is configured to determine whether the traffic light body is disposed in the horizontal or vertical orientation based on an arrangement of the lamps in the OFF the state detected on the image in frames.

4. A traffic light recognizing apparatus to be applied to a vehicle, the traffic light recognizing apparatus comprising:

a camera configured to perform a color imaging to capture an image of a driving environment in front of the vehicle; and a processor, wherein the processor is configured to detect a lighting region in a traffic light body of a traffic light on the image captured by the camera, detect a lamp in an ON state among lamps arranged in the traffic light body based on the lighting region, set search areas having the same dimensions as the lamp in the ON state at specific positions on the image that are horizontally and vertically aligned with the lamp in the ON state and are according to a lighting color of the lighting region, evaluate a luminance at an edge of each of the search areas and a luminance in a center of each of the search areas, and detect lamps in an OFF state among the lamps arranged in the traffic light body, and determine whether the traffic light body is disposed in a horizontal or vertical orientation based on an arrangement of the lamp in the ON state and the lamps in the OFF state.

5

*   *   *   *   *